United States Patent
Lazarus et al.

(10) Patent No.: US 9,199,881 B2
(45) Date of Patent: Dec. 1, 2015

(54) STYRENE-BUTADIENE BASED REDISPERSIBLE POLYMER POWDERS WITH IMPROVED STABILITY IN CEMENT APPLICATIONS

(75) Inventors: Etienne Lazarus, Marienthal (FR); Gerold Lohmüller, Baden-Baden (DE); Juergen Dombrowski, Halle (DE); Hartmut Kuehn, Halle (DE); Margarita Perello, Duberdorf (CH); Sonja Scharlemann, Wedemark (DE)

(73) Assignee: Dow Global Technologies, LLC, Midland, MI (US)

( * ) Notice: Subject to any disclaimer, the term of this patent is extended or adjusted under 35 U.S.C. 154(b) by 298 days.

(21) Appl. No.: 13/238,689

(22) Filed: Sep. 21, 2011

(65) Prior Publication Data

US 2012/0077907 A1    Mar. 29, 2012

Related U.S. Application Data

(60) Provisional application No. 61/386,681, filed on Sep. 27, 2010.

(51) Int. Cl.
| | |
|---|---|
| *C08K 3/00* | (2006.01) |
| *C04B 28/04* | (2006.01) |
| *C04B 28/06* | (2006.01) |
| *C04B 24/26* | (2006.01) |
| *C04B 40/00* | (2006.01) |
| *C08F 2/20* | (2006.01) |
| *C08J 3/12* | (2006.01) |
| *C08L 9/06* | (2006.01) |
| *C08L 15/00* | (2006.01) |
| *C08L 25/10* | (2006.01) |
| *C04B 103/00* | (2006.01) |

(52) U.S. Cl.
CPC ............. *C04B 24/2676* (2013.01); *C04B 28/04* (2013.01); *C04B 40/0042* (2013.01); *C08F 2/20* (2013.01); *C08J 3/12* (2013.01); *C08L 9/06* (2013.01); *C08L 15/00* (2013.01); *C08L 25/10* (2013.01); *C04B 2103/0055* (2013.01); *C04B 2103/0057* (2013.01); *C04B 2103/0066* (2013.01); *C08J 2309/06* (2013.01); *C08J 2325/10* (2013.01); *C08J 2429/04* (2013.01); *C08L 2205/02* (2013.01); *C08L 2205/03* (2013.01)

(58) Field of Classification Search
CPC    C04B 24/2676; C04B 24/2623; C04B 28/04; C04B 40/0042; C08J 3/12; C08F 9/06; C08F 2/20; C08F 8/02; C08F 16/06; C08F 8/34; C08L 15/00; C08L 25/10; C08L 29/04
USPC .................... 524/459, 503; 525/57
See application file for complete search history.

(56) References Cited

U.S. PATENT DOCUMENTS

| | | |
|---|---|---|
| 5,753,036 A | 5/1998 | Hornaman et al. |
| 6,300,403 B1 | 10/2001 | Mayer et al. |
| 2001/0025078 A1 | 9/2001 | Mayer et al. |
| 2002/0120043 A1 | 8/2002 | Rothenhausser et al. |
| 2007/0112128 A1 | 5/2007 | Weitzel et al. |
| 2007/0213430 A1 | 9/2007 | Bauer et al. |
| 2010/0119851 A1* | 5/2010 | Giessler-Blank et al. .... 428/447 |
| 2010/0221418 A1* | 9/2010 | Stadtbaumer et al. ........ 427/136 |

FOREIGN PATENT DOCUMENTS

| | | | |
|---|---|---|---|
| EP | 1038903 A1 | 9/2000 | |
| EP | 1158007 A1 | 11/2001 | |
| JP | 58-108207 | * 6/1983 | ............... C08F 8/12 |
| JP | 2005126544 A | 5/2005 | |
| WO | 9738042 A1 | 10/1997 | |
| WO | 9916794 A1 | 4/1999 | |
| WO | 0009589 A1 | 2/2000 | |
| WO | 2005035645 A2 | 4/2005 | |
| WO | 2008133375 A1 | 11/2008 | |

* cited by examiner

*Primary Examiner* — David W Wu
*Assistant Examiner* — Marie Reddick
(74) *Attorney, Agent, or Firm* — Andrew E. C. Merriam

(57) ABSTRACT

A water redispersible polymer powder is produced by drying an aqueous mixture of a carboxylated styrene butadiene polymer and a colloidal stabilizer which includes a polyvinyl alcohol modified with an alkyl end chain. The alkyl modified polyvinyl alcohol provides excellent redispersibility of the redispersible polymer powder without adversely affecting spray drying. Cement compositions such as mortars, which contain the redispersible polymer powder with the alkyl modified polyvinyl alcohol exhibit unexpectedly superior stability and an unexpectedly lower rate of mortar viscosity buildup which is advantageous for workability or troweling.

6 Claims, 3 Drawing Sheets

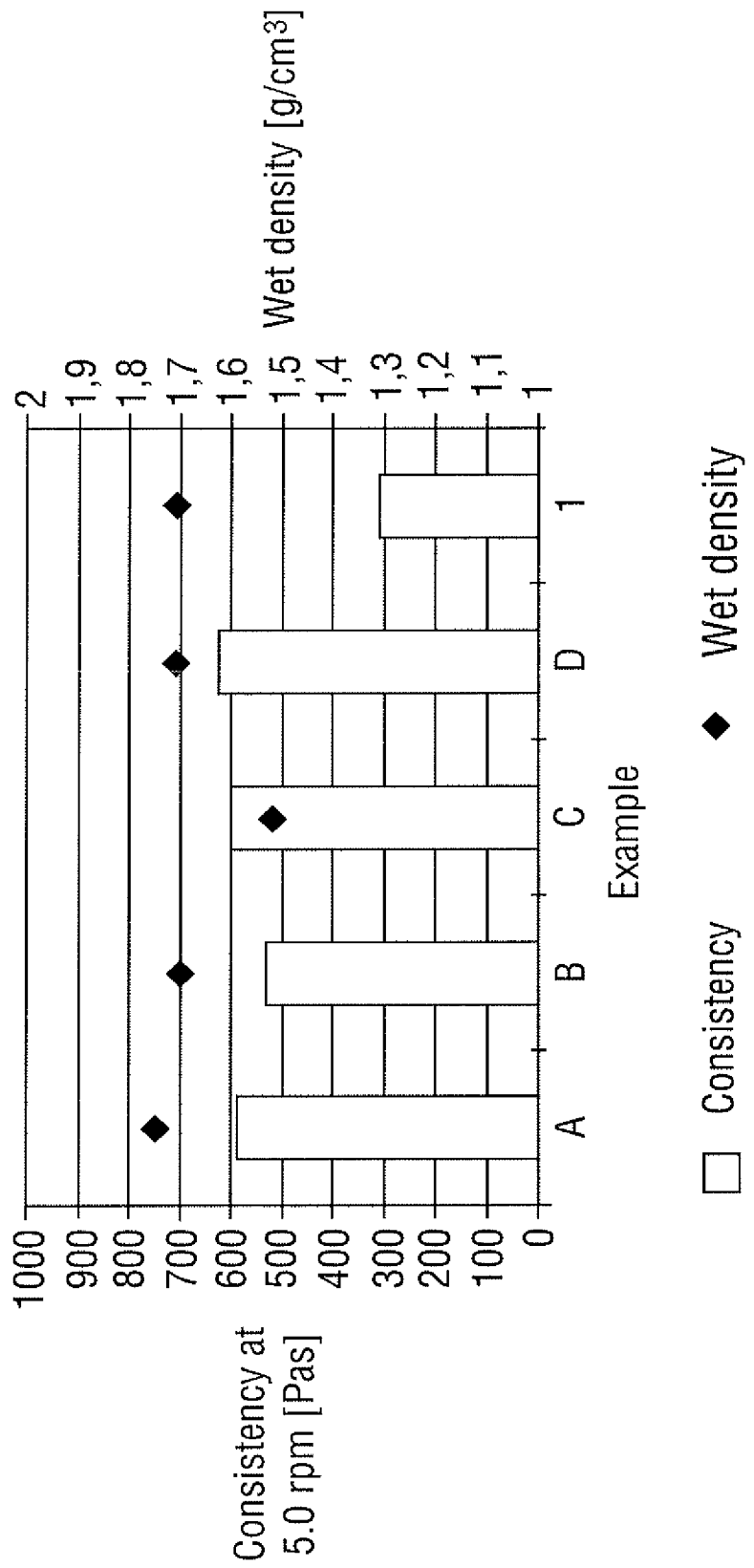

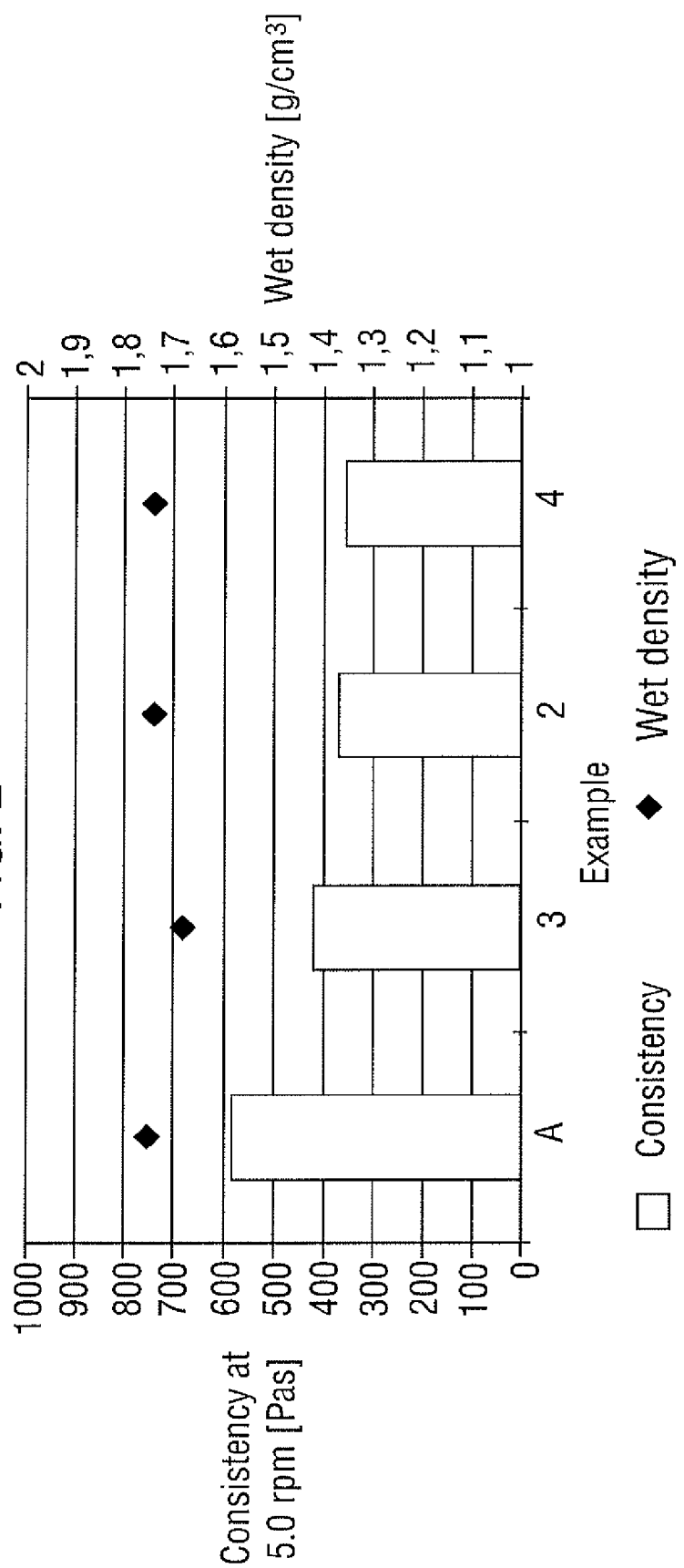

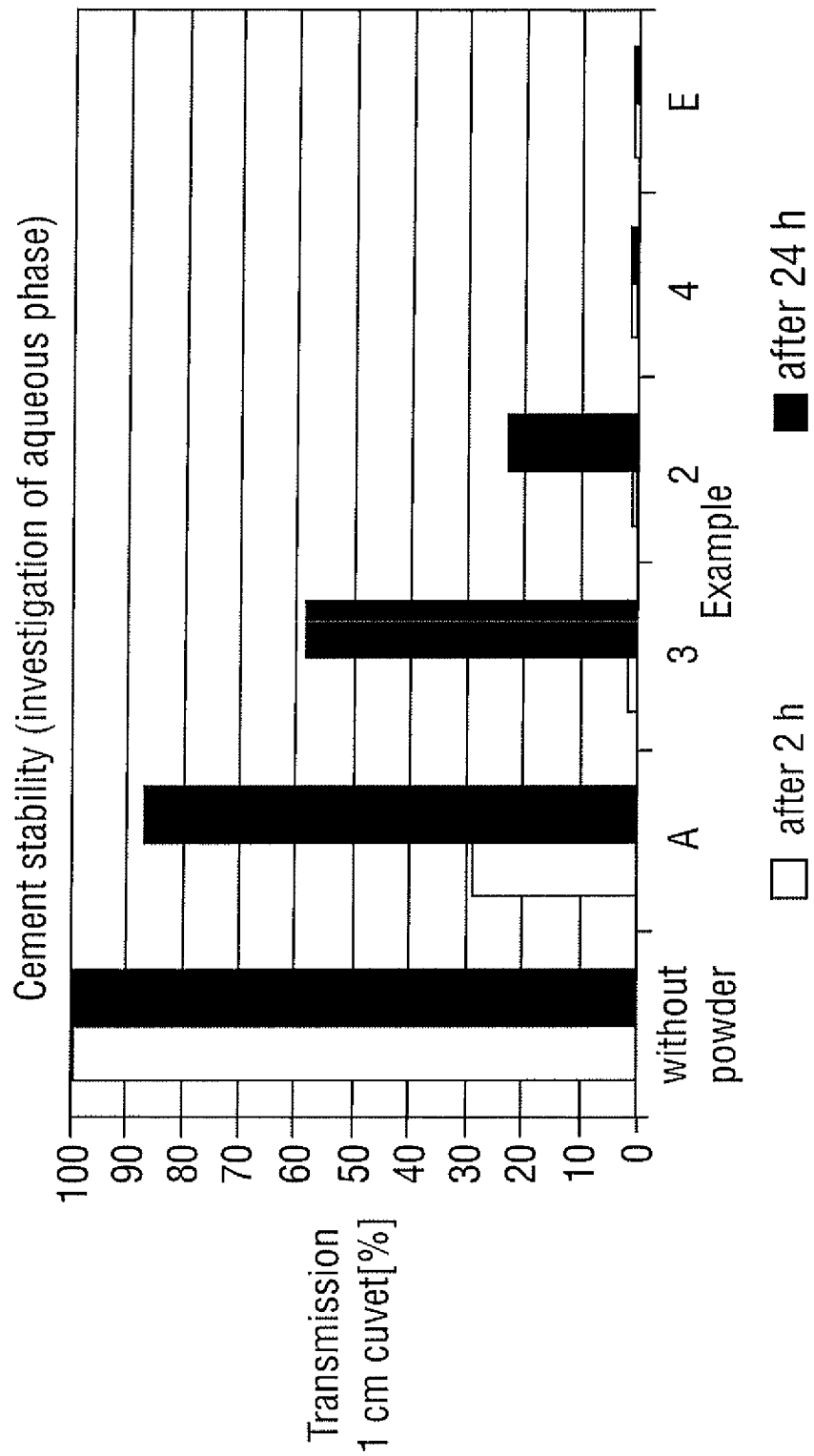

STYRENE-BUTADIENE BASED REDISPERSIBLE POLYMER POWDERS WITH IMPROVED STABILITY IN CEMENT APPLICATIONS

This application claims the benefit of priority under 35 U.S.C. §119(e) of U.S. Provisional Patent Application No. 61/386,681 filed on Sep. 27, 2010.

FIELD OF THE INVENTION

The present invention relates to redispersible polymer powder compositions which are prepared from a carboxylated styrene butadiene copolymer latex and a colloidal stabilizer for use in cement compositions.

BACKGROUND OF THE INVENTION

In construction applications, mortars may be prepared with cement, sand, and organic polymer. To reduce shipping costs, the polymer can be shipped and added in dry form as a redispersible polymer powder. Redispersible polymer powders are used as binders to improve the adhesion of cementicious adhesive formulations. The powdered form of the polymer is generally produced by spray drying a liquid polymer composition to obtain a free flowing powder. To perform its function in the application formulation to which it is added, such as concrete, it is desired that in the application formulation the polymer powder is easily redispersible. Redispersible styrene butadiene (SB) latex based powders provide some advantages in cementicious applications such as saponification resistance and cohesive strength when compared to redispersible vinylacetate (VAc) and vinylacetate ethylene (VAE) based powders. The typical polymer particle sizes of the SB latexes and the particle size of redispersed SB powders is significantly smaller compared to VAc/VAE latexes and their redispersed powders. Although a small particle size can be an advantage for the application, it also impacts the latex particle stability and the redispersed powder stability. The stability is a very critical factor in cement based applications due to the high pH and the high multivalent ion load. At the same latex level the available surface area is increased by a factor two when decreasing the particle size by 50%. In a non-critical environment, the stability of SB-latex, achieved by the carboxylation and surfactant, is sufficient. Liquid SB-latex used in cementicious applications needs to be additionally sterically stabilized with large amounts of surfactants. Unfortunately this approach leads to a significantly reduced redispersibility after spray drying due to the high surfactant amount.

The stabilization of redispersed polymer powder is also improved by the polyvinyl alcohol which is used as a spray drying aid for the production of the redispersible powder. However, the stabilization improvement of currently employed amounts of polyvinyl alcohol is not sufficient in the case of SB latexes even though the same amount of polyvinyl alcohol imparts stability to VAc/VAE latexes. Larger levels of conventionally employed PVOH, such as conventional partially hydrolyzed polyvinyl alcohol (PVOH) might improve the stability, but the required additional quantity would be beyond economically and technically justifiable limits. For example, for effective redispersibility a large amount of PVOH may be needed but it tends to adversely increase the viscosity of the polymer composition or dispersion making it difficult to produce a powder by spray drying. Moreover, at high pH values that are generally employed in polymer compositions or dispersions for making redispersible powders for high pH application formulations, such as cement formulations, partially hydrolyzed PVOH may continue to hydrolyze, reducing effectiveness of PVOH as a protective colloid. In all cases the stabilization of polymer particles is an indispensable prerequisite for excellent performance in cement based applications.

International Patent Application Publication WO 2008/133375 to Jeong Woo Son discloses that generally, when emulsion polymerization is performed using monomers such as acrylic monomers and styrenic monomers, an anionic or nonionic surfactant is used as an emulsifier. However, the emulsion prepared by using a surfactant has poor chemical stability when combined with an electrolyte, and as a result, if it is added to cement, or the like, fluidity of the cement composition is deteriorated. In order to overcome such problem associated with the use of the surfactant, it is disclosed, polyvinyl alcohol could be used as a protective colloid. In this case, the chemical stability was improved, but the polymerization stability was deteriorated, thereby still entailing a problem that a stable emulsion is hardly obtained. As disclosed in WO 2008/133375 there has, accordingly, been proposed a method involving using modified polyvinyl alcohol in which a functional group such as a mercapto group is introduced to one end, as a protective colloid, or a chain transfer agent in combination, to improve the polymerization stability. However, it is disclosed, this method leads to a reduced degree of polymerization, and as a result, it cannot satisfy water resistance, mechanical strength, durability, or the like. The WO 2008/133375 invention provides an acrylic acid ester copolymer emulsion composition, and redispersible powders made therefrom. According to WO 2008/133375, use of a polyvinyl alcohol having a degree of saponification of 85 mol % or more, and an average degree of polymerization of 300 to 1400; hydrophilic ethylenic unsaturated monomers having a water solubility of 1% or more; hydrophobic ethylenic unsaturated monomers having a water solubility of less than 1%; and a lipophilic initiator provides an acrylic acid ester copolymer composition which has excellent polymerization stability, and improved water resistance, alkali resistance, and fluidity. It is further disclosed that the redispersible powders prepared by spray drying of the acrylic acid ester copolymer composition have improved water redispersibility, and thus, can be used in various fields such as an additive to a hydraulic material, a powder paint, and an adhesive. However, production of a styrene butadiene based redispersible polymer powder which is both readily redispersible and stable in cement applications is not disclosed.

In the present invention, it has been surprisingly found, that use of a modified polyvinyl alcohol having an alkyl end group, as a colloidal stabilizer or spray drying aid for styrene butadiene latexes unexpectedly provides both excellent redispersibility and significant stability improvements in cement applications.

SUMMARY OF THE INVENTION

The present invention provides a redispersible polymer powder (RDP) comprised of at least one water insoluble polymer prepared from at least one water insoluble styrene butadiene (SB) copolymer latex and a colloidal stabilizer, comprising a modified polyvinyl alcohol. The modified polyvinyl alcohol has an alkyl end chain, such as a $C_6$ to $C_{20}$ alkyl group, preferably a $C_{10}$ to $C_{15}$ alkyl group, which is linked to the polyvinyl alcohol (PVOH) chain preferably by a sulfur group. In embodiments of the invention, the alkyl modified polyvinyl alcohol may have a number average molecular weight ($M_n$) of at least 2,500, or at least 5,000, or at least 10,000, for example from 15,000 to 50,000, preferably from 20,000 to 30,000. The water redispersible polymer powder of the present invention exhibits unexpectedly superior redispersibility and excellent stability in cementicious formulations. The RDP comprises a co-dried admixture of a water insoluble film-forming polymer and the alkyl modified polyvinyl alcohol alone, or in combination with an unmodified colloidal stabilizer, preferably an unmodified polyvinyl alcohol (PVOH), where the film forming polymer comprises a styrene-butadiene copolymer or the copolymerization product of styrene and butadiene with one or more other monomer. The film-forming polymer may have an average particle size of from 20 nm to 500 nm, preferably from 100 nm to 400 nm, most preferably from 150 nm to 300 nm, and an amount of carboxylation of from 0.1% by weight to 10% by weight, preferably from 0.5% by weight to 7% by weight, more preferably from 1% by weight to 5% by weight, of at least one ethylenically unsaturated mono- and/or dicarboxylic acid, salts thereof, or mixtures thereof, preferably itaconic acid and/or maleic acid, based upon the weight of the water insoluble film forming polymer. In aspects of the invention, the colloidal stabilizer, such as the alkyl modified polyvinyl alcohol alone or in combination with an unmodified PVOH may be employed in an amount of at least 1% by weight, for example from 2% by weight to 20% by weight, preferably from 5% by weight to 15% by weight, based upon the weight of the water insoluble film-forming polymer. In embodiments of the invention, the amount of the alkyl modified PVOH may be at least 5% by weight, for example from 10% by weight to 70% by weight, preferably from 40% by weight to 60% by weight, based upon the weight of the colloidal stabilizer.

In an aspect of the present invention, the redispersible polymer powder may be produced by drying an aqueous mixture of the water insoluble film-forming polymer and the colloidal stabilizer comprising the alkyl modified PVOH to obtain the water redispersible polymer powder. An aqueous dispersion of the water insoluble film-forming polymer may be provided by polymerization, and the colloidal stabilizer may be admixed with the aqueous dispersion after polymerization, and then the aqueous dispersion may be spray dried to obtain the water redispersible polymer powder. Use of the alkyl modified PVOH provides excellent redispersibility for SB polymers without adversely affecting spray drying while achieving excellent stability in cement based compositions.

In another aspect of the present invention, a dry mix formulation, or a cement composition such as a cement based tile adhesive, may be produced by admixing cement ingredients with the water redispersible polymer powder made from a SB copolymer latex to obtain a composition, such as a mortar, which exhibits excellent stability with an unexpectedly lower rate of viscosity buildup in latex processing and in use which is advantageous for workability or troweling.

BRIEF DESCRIPTION OF THE DRAWINGS

The present invention is further illustrated by the accompanying drawings wherein:

FIG. 1 is a graph showing cement stability as measured by mortar viscosity using a redispersible polymer powder (RDP) made with an alkyl modified polyvinyl alcohol of the present invention compared to the use of redispersible polymer powders made with other polyvinyl alcohols.

FIG. 2 is a graph showing cement stability as measured by mortar viscosity for RDPs as a function of different replacement levels of alkyl modified polyvinyl alcohols for unmodified PVOH.

FIG. 3 is a graph showing cement stability as measured by sedimentation for SB RDPs of the present invention compared to cement stability of a control RDP and a VAE RDP.

DETAILED DESCRIPTION OF THE INVENTION

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(meth)acrylate" includes, in the alternative, acrylate and methacrylate.

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "molecular weight" refers to a number average molecular weight as measured in a conventional manner.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, unless otherwise indicated, the measured glass transition temperature ($T_g$) is used. As used herein the term "calculated $T_g$" refers to the $T_g$ of a polymer calculated by using the Fox equation (T. G. Fox, Bull. Am. Physics Soc., Volume 1, Issue No. 3, page 123 (1956). As used herein the term "measured $T_g$" means a $T_g$ that is measured using differential scanning calorimetry or DSC (rate of heating 10° C. per minute, $T_g$ taken at the midpoint of the inflection.)

As used herein, the phrase "wt. %" stands for weight percent.

As used herein, unless otherwise indicated, the phrase "average particle size", refers to the particle diameter or the largest dimension of a particle in a distribution of powder particles as determined by laser light scattering such that 50 wt. % of the particles in the distribution are smaller than the particle and 50 wt. % of the particles in the distribution are larger than the particle. For initial latex dispersion particles, the average particle size was measured using a Nanotrac NPA 150, a product of Microtrac Inc (York, Pa.) per manufacturer's recommended Procedures via dynamic light scattering. The Doppler shift of light scattered from particles undergoing Brownian motion is compared to a reference beam established by the Fresnel reflection of the laser at the waveguide/medium interface (heterodyne detection) to generate a frequency spectrum, which is subsequently converted to a histogram of particle diameters through the Stokes-Einstein equation. A volume average particle size was recorded. For redispersed particles, the particle size distribution was measured using a Coulter LS 230 particle size analyzer, a product of Beckman Coulter (Brea, Calif.) per manufacturer's recommended Procedures via laser scattering. The scattering light from particles through laser scattering and polarization intensity differential scattering is collected as a function of angle, and subsequently converted to a particle size distribution.

The present inventors have found that for styrene butadiene redispersible polymer powders, use of a colloidal stabilizer comprising a polyvinyl alcohol modified with an alkyl end chain results in cement compositions having unexpectedly superior stability and an unexpectedly lower rate of mortar viscosity buildup which is advantageous for workability or troweling. It also results in excellent redispersibility without adversely affecting spray drying.

The modified polyvinyl alcohol has an alkyl end chain, such as a $C_6$ to $C_{20}$ alkyl group, preferably a $C_{10}$ to $C_{15}$ alkyl group, which is linked to the polyvinyl alcohol (PVOH) chain, preferably, by a sulfur group (S) as shown in general formula (1):

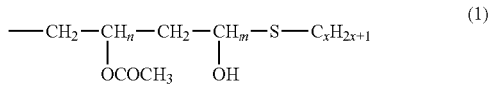

$$-CH_2-CH_n-CH_2-CH_m-S-C_xH_{2x+1} \quad (1)$$
$$\quad\quad\quad | \quad\quad\quad | $$
$$\quad\quad\quad OCOCH_3 \quad OH$$

where x may be an integer of from 6 to 20, preferably from 10 to 15, n and m may be the same or different and may each be an integer of at least 19, for example, from 30 to 300, or up to 58, preferably from 38 to 47. In embodiments of the invention, the alkyl modified polyvinyl alcohol may have a number average molecular weight ($M_n$) of at least 2,500, or at least 5,000, or at least 10,000, for example from 15,000 to 50,000, preferably from 20,000 to 30,000. The modified polyvinyl alcohol may be a nonionic PVOH, which is atactic and saponified to a high degree, for example at least 80% saponified. In embodiments of the invention, the linking group connecting the alkyl chain to the PVOH may be an oxygen group (O) instead of a sulfur group. The alkyl group may be a straight chain or branched alkyl group, but it is preferably a straight chain alkyl group, such as a dodecane group.

A commercially available alkyl modified polyvinyl alcohol which may be preferably employed in the present invention is Poval®MP-203, manufactured by Kuraray Co. Ltd., Tokyo, Japan. Poval MP-203 may have a degree of hydrolysis (mole %) of from 86.5 to 89.5, a viscosity of 4.5 to 5.5 mPa-s (4% aqueous solution at 20° C.), and a degree of polymerization (DP) of 350. It is believed that Poval®MP-203 is an atactic PVOH modified with dodecanethiol at its end, and has a molecular weight ($M_n$) of about 11,000.

In embodiments of the invention, the colloidal stabilizer may include an alkyl modified polyvinyl alcohol alone, or in combination with conventional colloidal stabilizers, such as an unmodified PVOH. A commercially available unmodified PVOH which may preferably be employed in the present invention is MOWIOL 4-88, which is a partially hydrolyzed PVOH (polyvinylalcohol) in granular form, and is available from Kuraray Europe GmbH, Division PVA/PVB D-65926 Frankfurt am Main, Germany. The MOWIOL 4-88 has a viscosity DIN 53015 of 4±0.5 mPa-s (4% aqueous solution at 20° C.), a degree of hydrolysis (saponification) of 87.7±1.0 mol. %, an ester value DIN 53401 of 140±10 mg KOH/g, a residual acetyl content of 10.8±0.8 w/w %, and a maximum ash content of 0.5% (calculated as $Na_2O$).

The colloidal stabilizer, such as the alkyl modified polyvinyl alcohol alone, or in combination with an unmodified PVOH may be employed in an amount of at least 1% by weight, for example from 2% by weight to 20% by weight, preferably from 5% by weight to 15% by weight, based upon the weight of the water insoluble film-forming polymer. In embodiments of the invention, the amount of the alkyl modified PVOH may be at least 5% by weight, for example from 10% by weight to 70% by weight, preferably from 40% by weight to 60% by weight, based upon the weight of the colloidal stabilizer, such as the total weight of the alkyl modified polyvinyl alcohol and the unmodified PVOH.

The polymers which may be employed in the present invention are water insoluble film-forming polymers which are carboxylated. Preferred water insoluble film-forming polymers are a styrene-butadiene copolymer or a styrene and butadiene copolymerized with other monomers with a low degree of carboxylation.

The water insoluble film-forming copolymers can be prepared by aqueous emulsion or suspension polymerization, preferably emulsion polymerization, in conventional manner, employing conventional polymerization temperatures, e.g. from 40° C. to 120° C., preferably, 70° C. or more, or, preferably, up to 105° C., and pressures, e.g. with diene comonomer pressures being 150 psi or below, preferably, 100 psi or below. The polymerization may be initiated using conventional amounts of one or more conventional water-soluble such as sodium persulphate, or oil (monomer) soluble initiator, such as t-butyl peroxide and cumene hydroperoxide, or a redox initiator combination, using a reducing agent such as sulfites and bisulfites. To control the molecular weight, conventional regulator substances or chain transfer agents, such as mercaptans, alkanols, and dimeric alpha methylstyrene can be used during the polymerization in conventional manner in conventional amounts of from 0.01 to 5.0% by weight, or, preferably, up to 3% by weight, based on the monomers to be polymerized. The polymerization process preferably takes place in known manner in the presence of conventional amounts of one or more conventional emulsifier and/or protective colloid, such as, for example, water soluble copolymers having a number average molecular weight of 2000 or more. Suitable emulsifiers include anionic, cationic and nonionic emulsifiers, for example anionic surfactants such as, for example, 8 to 18 carbon alkyl or alkyl aryl ether sulfates, and their salts, and nonionic surfactants, such as, for example, alkyl or alkyl aryl polyglycol ethers. Suitable protective colloids, instead of or in addition to one or more surfactants, may include, for example, polyvinyl alcohols; polysaccharides in water-soluble form, e.g. starches and cellulosics; proteins such as, for example, casein or soy protein; lignin sulfonates; and synthetic copolymers such as, for example, poly(meth) acrylic acid, and copolymers of (meth)acrylates with carboxyl-functional comonomer units.

One or more basic compound may be added before, during or after polymerization in an amount of 0.4 moles or more, preferably from 0.5 to 2 moles, more preferably 0.6 to 1.8 moles of carboxylic groups in the copolymer. Alternatively, the basic compound can be added in such an amount to adjust the pH of the aqueous copolymer product to 8.0 or more, or 9.5 or more, or, preferably at least 10.5, and preferably up to 12.5. The basic compound may be an inorganic basic compound, preferably a strong inorganic basic compound, such as an alkali metal hydroxide or an alkaline earth metal hydroxide, such as sodium hydroxide or potassium hydroxide.

The copolymers comprise the copolymerization product of from 20 to 79.9%, preferably, 30% or more, for example from 50% to 70% by weight, of one or more vinyl aromatic comonomer a), up to 79.9% preferably 60% or less, for example from 25% to 49% by weight of one or more 1,3-diene comonomer b), from 0.01 to 15% preferably from 0.5% to 10% or, more preferably from 1% to 5% by weight of comonomer c), and from 0 to 40%, preferably 0 to 20% or, more preferably 10% or less, by weight, of comonomer d), based on the total weight of monomers used to make the copolymer.

The comonomers and their weight proportions are chosen so as to make a copolymer having a glass transition temperature (Tg) of from −60° C. and above, preferably −20° C. or more, or, more preferably, −10° C. and above, or up to or less than 80° C., preferably up to or less than 35° C. or, more preferably up to or less than 25° C. If the Tg is too high for use in cement compositions, end use properties suffer, such as flexibility, especially in cold temperatures, and crack bridging. The Tg of the copolymers can be determined in a known manner by differential scanning calorimetry (DSC). In uses as a sacrificial binder in ceramic processing, the useful Tg of the SB RDP can be as high as 110° C., preferably 60° C.

Suitable comonomers a) include, for example, styrene, alpha-methylstyrene, $C_1$-$C_4$ alkyl-styrenes, such as o-vinyltoluene and tert-butylstyrene. Styrene is preferred. Suitable comonomers b) include, for example, 1,3-butadiene and isoprene, 1,3-butadiene being preferred. Suitable comonomers c) include, for example, ethylenically unsaturated mono-carboxylic acids, and/or di-carboxylic acids, their anhydrides, and their salts, and mixtures thereof, particularly itaconic acid and/or maleic acid and/or fumaric acid to improve the dispersibility of the redispersible copolymer powder.

Suitable optional comonomers d) include, for example, alkyl esters of (meth)acrylic acid, such as, for example, methyl methacrylate, ethylenically unsaturated carboxamides and carbonitriles, such as, for example, (meth)acrylonitrile; diesters of fumaric acid or maleic acid; hydroxy alkyl (meth)acrylates; sulfur acid monomers, phosphorus acid monomers, crosslinking comonomers, such as, for example, divinyl benzene or divinyl adipates; postcrosslinking comonomers, such as acrylamidoglycolic acid (AGA), allyl methacrylates or allyl N-methylol carbamates; epoxy-functional comonomers, such as glycidyl (meth)acrylates; and silicon-functional comonomers, such as alkoxysilane containing (meth)acrylates or vinyl monomers.

To increase the water redispersibility of the powder obtained upon drying, a basic compound, as described above, can be added prior to substantially drying the aqueous copolymer dispersion.

In a preferred embodiment, to achieve good water redispersibility and good odor control, 75% or more, preferably, 85% or more, or, more preferably, 95% or more of the total number of carboxyl groups in the copolymer are located at the surface of the copolymer latex particles in the powder particles. In such copolymers, 75% or more, preferably, 85% or more, or, more preferably, 90% or more, or, most preferably, 95% or more of the surface carboxyl groups are present in their salt form in the copolymer latex particles in the powder.

A high percentage of the carboxylic groups located at the surface of the copolymer particles obtained upon drying can be obtained by the sole use of ethylenically unsaturated dicarboxylic acid(s) as comonomer c), by staged monomer feeding, such as addition of the comonomer c) at an advanced stage of the polymerizations, or by conducting the polymerization at a pH of from 3 to 9 preferably, from 4 to 8, or, preferably 6 or higher.

The percentage of the carboxylic groups that are located at the surface of the polymer particles in the powder obtained upon drying encompasses all of the carboxylic groups located at the surface of the copolymer particles, those located in the liquid phase in low molecular weight acid aqueous solution copolymers or as free carboxylic acids or their salts, e.g. citric acid. Upon drying of the aqueous copolymer dispersion, the carboxylic groups located in the liquid phase solution copolymers deposit on the surface of the copolymer particles.

The sum of the molar amount of carboxylic groups located at the surface of the copolymer particles and the molar amount of carboxylic groups in the liquid phase of the aqueous dispersion are separately measurable in conventional manner.

In embodiments of the invention, the water insoluble film forming polymer has an amount of carboxylation as described above for comonomer c), such as, for example, from 0.1% by weight to 15% by weight, preferably from 0.5% by weight to 10% by weight, more preferably from 1% by weight to 5% by weight, of itaconic acid based upon the total comonomer weight or the weight of the water insoluble film forming polymer.

In accordance with the present invention, the water insoluble film-forming polymer in the aqueous dispersion or latex which is to be spray dried may have an average particle size of from 20 nm to 500 nm, preferably from 100 nm to 400 nm, most preferably from 150 nm to 300 nm.

The aqueous dispersions or latex, which refers generically to a stable dispersion or emulsion of polymer microparticles in an aqueous medium, obtained in the present invention may generally have a solids content of from 30 to 75% by weight, for example between 35% and 65% by weight, preferably from 40 to 60% by weight.

The water redispersible polymer powders of the present invention include a co-dried admixture of a water insoluble film-forming polymer and a colloidal stabilizer, where the film forming polymer comprises a styrene-butadiene copolymer or the copolymerization product of styrene, butadiene and one or more other monomer, and the colloidal stabilizer comprises a modified polyvinyl alcohol having an alkyl end for colloidal stabilization and redispersibility. Use of the polyvinyl alcohol modified with an alkyl end chain also results in cement compositions having unexpectedly superior stability and an unexpectedly lower rate of mortar viscosity buildup.

In accordance with the method of making the redispersible polymer powder of the present invention, a water redispersible polymer powder may be produced by drying an aqueous mixture of the water insoluble film-forming polymer and a colloidal stabilizer comprising a modified polyvinyl alcohol having an alkyl end chain to obtain a water redispersible polymer powder. The aqueous mixture to be spray dried may be prepared by admixing or blending a dispersion of the polymer with the modified polyvinyl alcohol and an unmodified polyvinyl alcohol together or sequentially. For example, in embodiments of the invention, before spray drying, an unmodified PVOH may admixed with a dispersion of the polymer and stirred to obtain a homogeneous mixture, followed by addition of the modified PVOH to the mixture with continued stirring to obtain a homogenous mixture. In other embodiments, the unmodified PVOH and the modified PVOH may be preblended or separately added to the dispersion of the latex and then all components may be mixed to obtain a homogeneous mixture. In preferred embodiments, an aqueous dispersion of the water insoluble film-forming polymer obtained by polymerization, is admixed with each component of the colloidal stabilizer separately to obtain a substantially homogeneous aqueous dispersion which is then spray dried to obtain the water redispersible polymer powder. In one example, the viscosity of the feed to be spray-dried may be adjusted via the solids content so that a value of less than 1000 mPas (Brookfield viscosity at 20 revolutions and 23° C.), preferably less than 250 mPas, is obtained. The solids content of the dispersion to be spray-dried may generally be from 25% to 65% by weight, for example from 35% by weight to 55% by weight, preferably from 40% to 50% by weight, based on the total weight of the dispersion. To prepare the water-redispersible polymer powders, the aqueous dispersions are dried, preferably by spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 130° C. to 170° C. The outlet temperature may generally be from 45° C. to 120° C., preferably from 60° C. to 90° C., depending on the plant, the $T_g$ of the polymeric composition, and the desired degree of drying.

In addition to the colloidal stabilizer, conventional optional additives in conventional amounts can be added prior to drying the aqueous dispersion, such as an antifoaming agent in an amount of up to 1.5% by weight of antifoam, based on the weight of the polymer particles. Other additives which may be employed, in conventional amounts, include one or more salts, such as $CaCl_2$, and $MgCl_2$, emulsifiers or surfactants, monosaccharides, disaccharides, and anticaking agents (antiblocking agents) such as kaolin, calcium carbonates or silicates. The amount of the anticaking agent, or other inorganic fillers may be up to 40% by weight, based upon the weight of the water redispersible polymer powder (RDP). In embodiments of the invention, conventional superplasticizers may be employed in an amount of at least 0.01% by weight, preferably from 5% by weight to 25% by weight, based upon the weight of the water redispersible polymer powder (RDP).

The X50 size of the particle size distribution of the redispersible powder depends on drying conditions and drying equipment. X50 represents the median diameter in micrometers, which means that 50% by weight of the particles are smaller than this diameter. The produced water-redispersible polymer powder preferably has an X50 particle size diameter of from 5 to 100 micrometers, more preferably from 20 to 100 micrometers, most preferably from 50 to 80 micrometers. The particle size distribution of the powder can be measured by laser diffraction using a particle size analyzer "Sympatec Helos" at a measuring range of 1.8-350 μm and dispersing the powder by compressed air.

The weight of the polymer particles in the powder, for example, weight of the carboxylated copolymer of vinyl aromatic comonomer and 1,3-diene comonomer described herein in the powder, may preferably be from 40% by weight to 95% by weight, more preferably from 65% by weight to 85% by weight, of the total weight of the water-redispersible polymer powder.

The water-redispersible polymer powder compositions of the present invention have a variety of uses. In embodiments of the invention, the carboxylated styrene-butadiene redispersible polymer powder compositions of the present invention may be employed in blends with one or more acrylic redispersible polymer powders (RDPs), VAE RDPs, VAE/VeoVA RDPs, epoxy based RDPs, polyurethane RDPs, polyolefin dispersion based RDPs, and mixtures thereof. The powders of the present invention may be employed as functional additives in a wide variety of compositions such as construction materials, personal care compositions, pharmaceutical compositions, and agricultural compositions, in high salt concentration applications or environments, such as offshore oil well cementing, oil and gas drilling and cementing, and in hard water. Additional uses of the powders are in waste management applications, such as compositions for synthetic covers for bulk material piles, such as waste, coal sludge containment, soil, soil erosion control, which minimize water infiltration, nuisance fugitive dust, odor, and affinity to birds. The powders may be used in alternative landfill covers that are sprayable, use inexpensive widely available and environmentally friendly recycled materials, have good adherence to plastics and glass waste, and can form/harden within a short time, and in adhesion enhancing admixtures. The powders may also be employed in the production of foams, such as polyurethane foams.

In preferred embodiments, the water-redispersible polymer powder may be used as an additive in a setting composition which may further include an inorganic hydraulic binder. Examples of inorganic binders include cements, such as Portland cement, alumina cement, pozzolanic cement, slag cement, magnesia cement and phosphate cement; gypsum hemihydrate and water-glass. Illustrative uses of the polymer composition according to the present invention are in tile adhesives, construction adhesives, renders, joint mortars, plasters, troweling compositions, filling compositions, such as floor filling compositions (e.g. self-leveling flooring compounds), concrete repair joints, joint mortars, tape joint compounds, concrete, water proofing membrane applications, crack isolation membrane applications, and additives for ceramic processing. In particular, the use of the water-redispersible polymer powder described herein in a setting composition, e.g. in cement-based tile adhesives or in external thermal insulation composite systems, result in compositions with high initial adhesion strength, high adhesion strength after immersion in water (water resistance), and high adhesion strength after allowing a certain "open time" before final application of the hydrated setting composition. In embodiments of the invention, the water-redispersible polymer powder may be employed as a binder for slip casting, of for example raw materials such as silica, alumina, alkali metal oxides, and alkaline earth metal oxides.

A preferred use of the water-redispersible polymer powder is in cementicious or hydraulic compositions or other compositions which exhibit a high pH, for example a pH of at least 11, for example from 11.5 to 13.5. The redispersible polymer powders of the present invention may be employed in tile adhesives, such as cement-based tile adhesives. Cement-based tile adhesives may generally comprise 5 to 50 parts by weight of cement, preferably Portland cement, as the hydraulic binder; 40 to 70 parts by weight of quartz sand, preferably having a particle size of from 0.1 mm to 0.5 mm, as the main filler, and 0.1% to 10% by weight, preferably 1% to 6% by weight (based on the dry weight of the tile adhesive) of the redispersible polymer powder composition according to the present invention. Further optional components include one or more cellulose ethers (preferably in a total amount of 0.05% to 1% by weight, more preferably 0.2% to 0.5% by weight, based on the dry weight of the tile adhesive) to control rheology, water retention, slip resistance and improved workability; quartz or lime stone powder having a particle size of from 30 μm to 60 μm as fine co-filler to improve consistency and workability; and cellulose or mineral fibers to improve the slip resistance.

Another use of the water-redispersible polymer powders is in self-leveling flooring compounds SLFC. The powders may be added to improve the adhesion to the substrate, the flexibility, the abrasion resistance and the aging properties. The SLFC may generally include the same components in the same amounts as employed in the CBTAs. A retarder or retardant, such as trisodium citrate (TriNa-Citrate), such as Censperse PC13 available from Newchem AG, Pfäffikon, Switzerland, may be employed in conventional amounts generally employed in SLFC. The SLFC may also include calcium sulfate (gypsum), an accelerator, such as lithium carbonate, and a liquefier, dispersant, or superplasticizer, such as a water soluble co-polymer dispersant, such as MELFLUX 2651F, which is based on modified polycarboxylate technology and produced by BASF Construction Polymers, Kennesaw Ga., in conventional amounts. In other embodiments, the water-redispersible polymer powder may be used in external thermal insulation systems ETICS, particularly as an adhesive on the thermally insulating board layer to reduce the water absorption and improve the impact resistance of the external thermal insulation system.

Furthermore, the water-redispersible polymer powder according to the present invention may be used in paper products, paperboard products, carpet backing, paints or coatings or in binders for wood, paper or textiles coatings or impregnating compositions, preferably in the absence of a substantial amount of an inorganic hydraulic binding agent, more preferably in the absence of any amount of an inorganic hydraulic binding agent. For example, the water-redispersible polymer powder may be used as the sole binder in coating compositions and adhesives.

The following examples are provided for illustrative purposes only and are not intended to limit the scope of the claims that follow. Unless otherwise indicated, all parts and percentages are by weight, all temperatures are in °C., and all pressures are in bars or atmospheric unless otherwise indicated to the contrary.

EXAMPLE 1

A redispersible polymer powder was produced by admixing: a) a water insoluble film forming carboxylated styrene butadiene (SB) latex which has a comonomer content of 62 parts styrene, 35 parts butadiene, and 3 parts itaconic acid (a carboxylation of 3% by weight of itaconic acid, based upon the total comonomer weight), with a particle size of 155 nm, a $T_g$ of less than 25° C., and a pH adjusted to 11 with sodium hydroxide, b) 5% by weight of MOWIOL 4-88, based upon the weight of the latex polymer, and c) 5% by weight of Poval®MP-203, based upon the weight of the latex polymer. The MOWIOL 4-88 is an unmodified PVOH. It is a partially hydrolyzed PVOH (polyvinylalcohol) in granular form, and is available from Kuraray Europe GmbH, Division PVA/PVB D-65926 Frankfurt am Main, Germany. The MOWIOL 4-88 has a viscosity DIN 53015 of 4±0.5 mPa-s (4% aqueous solution at 20° C.), a degree of hydrolysis (saponification) of 87.7±1.0 mol. %, an ester value DIN 53401 of 140±10 mg KOH/g, a residual acetyl content of 10.8±0.8 w/w %, and a maximum ash content of 0.5% (calculated as $Na_2O$). Poval®MP-203 is a modified PVOH having an alkyl end chain. Poval®MP-203 is manufactured by Kuraray Co. Ltd., Tokyo, Japan and may have a degree of hydrolysis (mole %) of from 86.5 to 89.5, a viscosity of 4.5 to 5.5 mPa-s (4% aqueous solution at 20° C.), and a degree of polymerization (DP) of 350. It is believed that Poval®MP-203 is an atactic PVOH modified with dodecanethiol at its end, and has a molecular weight ($M_n$) of about 11,000. The mixture is prepared by admixing the unmodified PVOH, Mowiol 4-88 with the latex dispersion, stirring to obtain a homogeneous mixture, then adding the modified PVOH, Poval®MP-203, and then stirring to obtain a substantially homogeneous mixture. The mixture has a total solids content of 40% by weight, based upon the total weight of the mixture.

This mixture was pumped to a two-fluid nozzle atomizer equipped on a NIRO mobile spray dryer. The air pressure to the nozzle was 80 kg/hr of airflow, and the water evaporation was 1 kg/hr. The spray drying was conducted in an air environment with an inlet temperature fixed at 130° C., and the outlet temperature was targeted to 50° C.±1° C. by tuning the feed rate of the mixture. Concurrently, kaolin powder (KaMin HG 90) was added into the chamber for spray drying as an anti-caking agent, with the amount being controlled to be 13% by weight of the dry powders.

The redispersible polymer powder obtained by the spray drying had an average particle size between 15 to 20 µm. The residual moisture content (rm) of the powder was 1.33% by weight of the powder. The spray dried powder is readily dispersible in water. Redispersibility of the powder was characterized by two different methods: sedimentation and particle size of the redispersion.

1. Sedimentation of Particles of the Diluted Redispersion:

Large and non-redispersed particles settle and form a sediment, with the less sediment formed, the better is the redispersibility. This method is usually the favored method in the daily routine, and it delivers good repeatable results. In this method, a 1:1 mixture of water and powder is stirred intensively for 30 minutes. Then, 5 g of the final redispersion is mixed with 45 g water and filled into a graduated glass tube having a diameter of 1 cm. The sedimentation, or thickness of the sediment layer which is formed was measured (mm) after 24 hours and found to be 3 mm.

2. Particle Size Distribution of the Redispersion:

In this method, the particle size distribution of the powder is measured by laser diffraction using a particle size analyzer "Sympatec Helos" at a measuring range of 1.8-350 µm, and by dispersing the powder in a water containing measuring cell, using a 100 sec. ultrasound treatment. The X50 particle size of the redispersion in the measurement range of 1.8-350 µm was found to be 2.78 µm.

EXAMPLE 2

A redispersible polymer powder was produced as in Example 1 except that in Example 2: a) 7% by weight of the unmodified polyvinyl alcohol MOWIOL 4-88, based upon the weight of the latex polymer, and b) 3% by weight of the alkyl modified polyvinyl alcohol Poval®MP-203, based upon the weight of the latex polymer were used. The residual moisture content (rm) of the powder was 1.10% by weight of the powder. Redispersibility of the powder as characterized by sedimentation after 24 hours was 2 mm. The X50 particle size of the redispersion in the measurement range of 1.8-350 µm was 2.58 µm.

EXAMPLE 3

A redispersible polymer powder was produced as in Example 1 except that in Example 3: a) 9% by weight of the unmodified polyvinyl alcohol MOWIOL 4-88, based upon the weight of the latex polymer, and b) 1% by weight of the alkyl modified polyvinyl alcohol Poval®MP-203, based upon the weight of the latex polymer were used. The residual moisture content (rm) of the powder was 1.02% by weight of the powder. Redispersibility of the powder as characterized by sedimentation after 24 hours was 3 mm. The X50 particle size of the redispersion in the measurement range of 1.8-350 µm was 2.78 µm.

EXAMPLE 4

A redispersible polymer powder was produced as in Example 1 except that in Example 4: the mixture is prepared by admixing the unmodified PVOH, Mowiol 4-88 with the alkyl modified PVOH, Poval®MP-203, and then stirring to obtain a substantially homogeneous preblended mixture, and then admixing the preblended mixture with the latex dispersion, and stirring to obtain a homogeneous mixture. The residual moisture content (rm) of the powder was 1.10% by weight of the powder. Redispersibility of the powder as characterized by sedimentation after 24 hours was 2 mm. The X50 particle size of the redispersion in the measurement range of 1.8-350 µm was 3.89 µm.

COMPARATIVE EXAMPLE A

A redispersible polymer powder was produced as in Example 1 except that in Comparative Example A: a) 10% by weight of the unmodified polyvinyl alcohol MOWIOL 4-88, based upon the weight of the latex polymer was used, and b) no alkyl modified polyvinyl alcohol Poval®MP-203 was used. The residual moisture content (rm) of the powder was 1.20% by weight of the powder. Redispersibility of the powder as characterized by sedimentation after 24 hours was 4 mm. The X50 particle size of the redispersion in the measurement range of 1.8-350 μm was 2.61 μm.

COMPARATIVE EXAMPLE B

A redispersible polymer powder was produced as in Example 1 except that in Comparative Example B the 5% by weight of the alkyl modified polyvinyl alcohol Poval®MP-203 was replaced by a PVOH modified with carboxylic groups, KL-506, in an amount of 5% by weight, based upon the weight of the latex polymer. KL-506 is manufactured by Kuraray Co. Ltd., Tokyo, Japan and may have a degree of hydrolysis (mole %) of from 74 to 80%, and a viscosity of 5.2 to 6.2 mPa-s (4% aqueous solution at 20° C.). and a degree of polymerization (DP) of 620. The residual moisture content (rm) of the powder was 1.24% by weight of the powder. Redispersibility of the powder as characterized by sedimentation after 24 hours was 5 mm. The X50 particle size of the redispersion in the measurement range of 1.8-350 μm was 3.29 μm.

COMPARATIVE EXAMPLE C

A redispersible polymer powder was produced as in Example 1 except that in Comparative Example C the 5% by weight of the alkyl modified polyvinyl alcohol Poval®MP-203 was replaced by a PVOH modified with ethylene groups, RS-3110, in an amount of 5% by weight, based upon the weight of the latex polymer. RS-3110 is manufactured by Kuraray Co. Ltd., Tokyo, Japan and may have a degree of hydrolysis (mole %) of from 97.5 to 99%, and a viscosity of 11 to 15 mPa-s (4% aqueous solution at 20° C.). The residual moisture content (rm) of the powder was 0.94% by weight of the powder. Redispersibility of the powder as characterized by sedimentation after 24 hours was 4 mm. The X50 particle size of the redispersion in the measurement range of 1.8-350 μm was 2.96 μm.

COMPARATIVE EXAMPLE D

A redispersible polymer powder was produced as in Example 1 except that in Comparative Example D the 5% by weight of the alkyl modified polyvinyl alcohol Poval®MP-203 was replaced by a PVOH modified with silanol groups, R-2105, in an amount of 5% by weight, based upon the weight of the latex polymer. The R-2105 is manufactured by Kuraray Co. Ltd., Tokyo, Japan and may have a degree of hydrolysis (mole %) of from 98 to 99%, and a viscosity of 4.5 to 6.0 mPa-s (4% aqueous solution at 20° C.). The residual moisture content (rm) of the powder was 1.23% by weight of the powder. Redispersibility of the powder as characterized by sedimentation after 24 hours was 5.5 mm. The X50 particle size of the redispersion in the measurement range of 1.8-350 μm was 3.15 μm.

COMPARATIVE EXAMPLE E

A commercially available redispersible polymer powder DLP 2000 which is a Vinylacetate-ethylene copolymer (VAE RDP) having a $T_g$ of 17° C., an ash content of 10% by weight, and which is colloidally stabilized with 10% by weight unmodified PVOH, MOWIOL 4-88, based upon the weight of the latex polymer, was used as a comparative example of an RDP which was not a carboxylated SB RDP and which did not contain any modified PVOH. The DLP 2000 is produced by The Dow Chemical Company, Midland, Mich.

EXAMPLE 5

The components and their relative amounts (% by weight or parts by weight, pbw) which may be used to prepare cement-based mortar compositions using the redispersible powder compositions of Examples 1, 2, 3, and 4, and Comparative Examples A, B, C, D, and E are shown in Table 1, below. The different cement-based mortar compositions may be prepared by dry blending the solid components indicated in Table 1, and then adding water. The cement and the redispersible polymer powder were placed in a 150 ml labor glass and mixed with a spatula for a half minute. Then water was added and stirred with the spatula for 3 minutes. After that the consistency of the mortar was measured. The temperature during the mixing and measurement was 21° C.

TABLE 1

| Cement-based Mortar Formulations | |
|---|---|
| RAW INGREDIENT | FORMULA, WT % |
| Portland Cement Type 1 42.5 | 95 |
| Redispersible Polymer Powder (RDP) for each Example or Comparative Example | 5 |
| Total Dry Mix, % by weight | 100 |
| Water | 37 |

Various properties of the redispersible polymer powders, their above-described redispersibility (24 hr sedimentation and X50 particle size), and cement stability of the cement-based mortar compositions as a function of type and amount of PVOH employed as a colloidal stabilizer in the RDPs are shown in Table 2.

Cement Stability of RDP By Mortar Viscosity: The Brookfield Viscosity of the mortar or mixture of 95 parts by weight cement, 5 parts by weight of the styrene butadiene (SB) redispersible polymer powder and 37 parts by weight water was measured using a Brookfield Viscometer Model DV II with a Helipath Stand Model D under the conditions of 5 rpm, spindle F, and 21° C., using about 25 measuring points per sample (double measurement). The viscosity readings were in mPas and were converted to Pas. In this method, unstable polymer particles have greater agglomeration which results in a higher viscosity. Thus, the lower the measured viscosity, the better is the stability of the polymer particles.

Cement Stability of RDP By Mortar Sedimentation: The mortar was dispersed in water in a weight ratio of 10:90 and the sedimentation was followed to characterize cement stability of the redispersible polymer powders. In this method, unstable polymer particles cause agglomeration and the finely dispersed polymer particles disappear resulting in a complete sedimentation which correlates with a poor stabilization of the polymer particles. The sedimentation can be followed by different methods, such as: 1) measurement of turbidity, 2) visual by photos, and 3) measurement of the polymer sediment layer thickness. For the present examples, the sedimentation was characterized by measurement of the turbidity of the cement/polymer—water mixture by following the light transmission after a defined time using a light transmission measurement device, a Spekol 11 (wave length 546 nm) spectrophotometer, calibrated so that 100% transmission is clean water, and 0% is no transmissibility. For the transmission measurements, 5 g of the cement/powder/water mixture as used in the consistency measurement was admixed with 45 g water in a labor glass and stirred with a spatula for 1 minute. After 2 hours, and again after 24 hours a 1 cm cuvette was filled with the upper aqueous phase from the labor glass. The transmission of the cuvette with the aqueous phase was measured with the Spekol 11 (Carl Zeiss Jena) spectrophotometer at a light wavelength of 546 nm. As a control, the sedimentation of a mortar prepared with only cement and water and no redispersible polymer powder was measured and found to be 100% after 2 hours and 100% after 24 hours.

Wet Density: To measure the wet density of the mortar, a 50 cm³ plastic cylinder was filled completely with the mortar mixture (cement, powder and water) and the weight (g net) was determined.

amount of a different modified PVOH (Comparative Examples B, C, and D). Also, as shown in Table 2 and FIG. 1, the wet densities for each mortar are comparable.

The influence of the amount of alkyl modified PVOH on cement stability is shown in FIG. 2 and Table 2. Cement stability as measured by mortar viscosity, and wet density were plotted for Examples 2, 3, and 4 and Comparative Example A in FIG. 2. As shown in Table 2 and in FIG. 2, replacement of the unmodified PVOH, Mowiol 4-88 in the SB RDP of Comparative Example A with an alkyl modified PVOH, MP-203 as in Examples 2, 3, and 4, provides an unexpectedly lower mortar viscosity and higher stability compared to the use of only the conventional unmodified PVOH Mowiol 4-88. Also, as shown in FIG. 2 and Table 2, as the amount of alkyl modified PVOH increases, the viscosity decreases and accordingly the stability increases. The wet densities for each mortar are comparable as shown in Table 2 and FIG. 2.

TABLE 2

Redispersibility and Cement Stability for Redispersible Polymer Powders

| Example | Latex | Unmodified PVOH Mowiol 4-88 (wt %) | Modified PVOH Type | Wt % | RDP Redispersibility RM Wt % (mm) | 24 hr | X50 redispersion (μm) | Mortar Wet Density (g/cm³) | Cement Stability of the RDP Consistency (Viscosity) Pas | Sedimentation 2 hrs, % | 24 hrs, % |
|---|---|---|---|---|---|---|---|---|---|---|---|
| Ex. 1 | SB | 5 | End Alkyl MP-203 | 5 | 1.33 | 3 | 2.78 | 1.71 | 312 | — | — |
| Ex. 2 | SB | 7 | End Alkyl MP-203 | 3 | 1.10 | 2 | 2.58 | 1.74 | 373 | 0.5 | 23 |
| Ex. 3 | SB | 9 | End Alkyl MP-203 | 1 | 1.02 | 3 | 2.78 | 1.68 | 422 | 1.3 | 58 |
| Ex. 4 | SB | 5 | End Alkyl MP-203 | 5 | 1.10 | 2 | 3.89 | 1.74 | 358 | 0.2 | 0.5 |
| Comp A | SB | 10 | — | — | 1.20 | 4 | 2.61 | 1.75 | 585 | 29 | 87 |
| Comp B | SB | 5 | Carboxylic KL-506 | 5 | 1.24 | 5 | 3.29 | 1.70 | 533 | — | — |
| Comp C | SB | 5 | Ethylene RS3110 | 5 | 0.94 | 4 | 2.96 | 1.52 | 599 | — | — |
| Comp D | SB | 5 | Silanol R-2105 | 5 | 1.23 | 5.5 | 3.15 | 1.71 | 625 | — | — |
| Comp E | VAE | 10 | — | — | — | — | — | — | — | 0.6 | 0.6 |

As shown in Table 2, the redispersibility of the SB RDPs made with the alkyl modified PVOH as in Examples 1, 2, 3, and 4 was better than the redispersibility of the SB RDPs made without the alkyl modified PVOH as in Comparative Examples A, B, C, and D, as measured using the 24 hour sedimentation test. The redispersibility as measured by the less consistent X50 redispersion test was generally comparable for Examples 1, 2, and 3 and Comparative Example A, and was generally better for Examples 1, 2, and 3 compared to Comparative Examples B, C, and D. Although the redispersibility for Example 4 as measured by the X50 redispersion test was not as good as for the other Examples, it was still quite acceptable.

The cement stability as measured by mortar viscosity, and wet density were plotted for Example 1 and Comparative Examples A, B, C, and D in FIG. 1. As shown in Table 2 and in FIG. 1, the SB RDP of Example 1 containing 5% by weight of the alkyl modified PVOH, MP-203, in combination with 5% by weight of an unmodified PVOH, Mowiol 4-88, results in an unexpectedly lower viscosity and higher stability of the cement/SB polymer powder mortar compared to the use of 10% by weight of an unmodified PVOH alone (Comparative Example A), or in combination with the same replacement The cement stability as measured by sedimentation after 2 hours and after 24 hours was plotted for SB RDP Examples 2, 3, and 4, and VAE RDP Comparative Example E and is shown in FIG. 3. In addition, as a control, the sedimentation for a mortar which did not contain any RDP was measured and plotted in FIG. 3. The shown in FIG. 3 and Table 2, confirms the mortar stability findings obtained by measurement of mortar viscosity as shown in FIG. 1 and FIG. 2. As shown in FIG. 3 and Table 2, replacement of the unmodified PVOH, Mowiol 4-88 in the SB RDP of Comparative Example A with an alkyl modified PVOH, MP-203 as in Examples 2, 3, and 4, provides an unexpectedly lower mortar transmission in the sedimentation test and thus less agglomeration or flocculation, less sedimentation, and unexpectedly higher stability of the polymer dispersion compared to the use of only the conventional unmodified PVOH Mowiol 4-88. Also, as shown in FIG. 3 and Table 2, as the amount of alkyl modified PVOH increases, the transmission decreases and accordingly the stability increases. As shown in FIG. 3 and Table 2 use of 5% by weight of the alkyl chain modified PVOH (Example 4) in a SB RDP unexpectedly provides as good mortar stability as the benchmark VAE copolymer based redispersible polymer powder of Comparative Example E.

What is claimed is:

1. A water redispersible polymer powder (RDP) composition comprising an admixture of a water insoluble film-forming polymer which is carboxylated and from 2% by weight to 20% by weight, based upon the weight of the water insoluble film-forming polymer of a colloidal stabilizer, said film forming polymer comprising a carboxylated styrene-butadiene copolymer, and said colloidal stabilizer comprising a combination of a polyvinyl alcohol having an alkyl end chain of from 6 carbon atoms to 20 carbon atoms (alkyl modified polyvinyl alcohol) and an unmodified polyvinyl alcohol wherein the amount of the alkyl modified polyvinyl alcohol is from 5% by weight to 70% by weight based on the weight of the colloidal stabilizer, optionally, the water redispersible polymer powder composition further comprising cement ingredients in a dry mix formulation of the water redispersible polymer powder in an amount of at least 0.1% by weight, based upon the weight of the dry mix formulation.

2. The water redispersible polymer powder composition as claimed in claim 1 wherein the alkyl modified polyvinyl alcohol comprises a polyvinyl alcohol which is modified by reacting the polyvinyl alcohol with an alkylthiol.

3. The water redispersible polymer powder composition as claimed in claim 2 wherein the alkyl modified polyvinyl alcohol has a number average molecular weight of at least 2,500.

4. A method for producing a water redispersible polymer powder composition comprising drying an aqueous mixture of a water insoluble film-forming polymer and from 2% by weight to 20% by weight, based upon the weight of the water insoluble film-forming polymer of a colloidal stabilizer to obtain a water redispersible polymer powder, wherein the film forming polymer is carboxylated and comprises a carboxylated styrene-butadiene copolymer, and the colloidal stabilizer comprises a combination of a polyvinyl alcohol having an alkyl end chain of from 6 carbon atoms to 20 carbon atoms (alkyl modified polyvinyl alcohol) and an unmodified polyvinyl alcohol wherein the amount of the alkyl modified polyvinyl alcohol is from 5% by weight to 70% by weight based on the weight of the colloidal stabilizer.

5. The method for producing a water redispersible polymer powder composition as claimed in claim 4 wherein the alkyl modified polyvinyl alcohol comprises a polyvinyl alcohol which is modified by reacting the polyvinyl alcohol with an alkylthiol, and the water insoluble film-forming polymer is a copolymer comprising in copolymerized form, the monomers styrene, butadiene, and at least one ethylenically unsaturated mono-and/or di-carboxylic acid, salts thereof, or mixtures thereof.

6. The method for producing a water redispersible polymer powder composition as claimed in claim 4 wherein the alkyl modified polyvinyl alcohol has a number average molecular weight of at least 2,500.

* * * * *